Nov. 27, 1951 W. H. SCHMITT 2,576,540
PRESSURE REGULATOR
Filed May 18, 1948 2 SHEETS—SHEET 1

INVENTOR:
WILLIAM H. SCHMITT
BY W. U. Beatty
ATTORNEY.

Nov. 27, 1951     W. H. SCHMITT     2,576,540
PRESSURE REGULATOR

Filed May 18, 1948     2 SHEETS—SHEET 2

INVENTOR:
WILLIAM H. SCHMITT
BY
W. E. Beatty
ATTORNEY.

Patented Nov. 27, 1951

2,576,540

UNITED STATES PATENT OFFICE 2,576,540

PRESSURE REGULATOR

William H. Schmitt, Rialto, Calif., assignor to The Rialto Corporation, Rialto, Calif., a corporation of California Application May 18, 1948, Serial No. 27,692

6 Claims. (Cl. 137—153)

1

The invention relates to a pressure regulator, particularly for a system wherein a pump supplies liquid under pressure to a tank, the tank serving as a source of liquid pressure for one or more hydraulic cylinders. The tank pressure is regulated by means of a regulator valve movable to one position to by-pass the pump whereby it operates under practically no load, or to another position to close the by-pass and cause the pump to deliver fluid under pressure to the tank. The regulator by-pass valve is operated in accordance with the tank pressure. The advantage of this by-pass system is that the motor which drives the pump may be left in constant operation, the pump operating under load or no load, as required.

The usual spring operated pressure regulator valve has a tendency to chatter as the pump has to work against the pressure of the spring. The disadvantage of employing a spring on the regulator is overcome by operating the by-pass regulator valve by a differential fluid pressure, namely, by the difference between a constant regulated air pressure and the tank pressure. Such an arrangement still has the disadvantage, in common with other types of regulator valves, of causing the fluid passing through the valve to heat up at times when the valve is in a partially open position, as the work of forcing the fluid through the valve is converted into heat at the restricted valve opening. A principal object of the present invention is to overcome this heating, and this is accomplished by giving the valve only two operative positions, namely, a fully open position or a fully closed position, and by causing the valve to quickly move from one position to the other with a snap action.

The constant regulated air pressure which is one of the controlling factors in operating the by-pass valve, has a check valve to prevent reverse flow. When the differential piston, which actuates the valve, moves in the direction in which the check valve seats, back pressure is built up, whereas such pressure should remain constant. To prevent such back pressure from hindering the snap action of the by-pass valve, the invention provides means for relieving such back pressure when it exceeds the value of the constant regulated supply.

Figure 1:
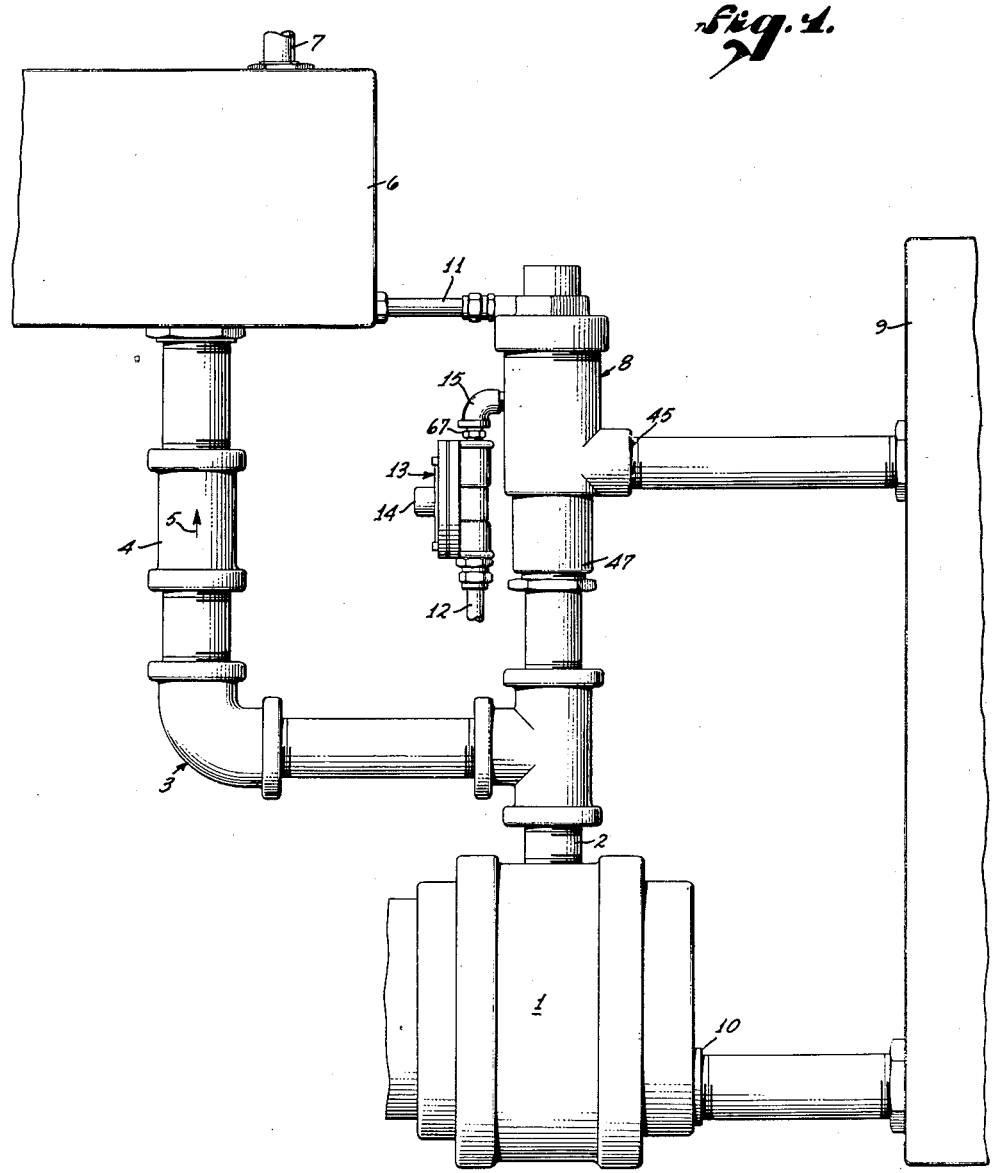

For further details of the invention, reference may be made to the drawings wherein Fig. 1 is a schematic diagram of a pressure regulator according to the present invention as applied to regulating the by-pass from a pump.

Figure 2:
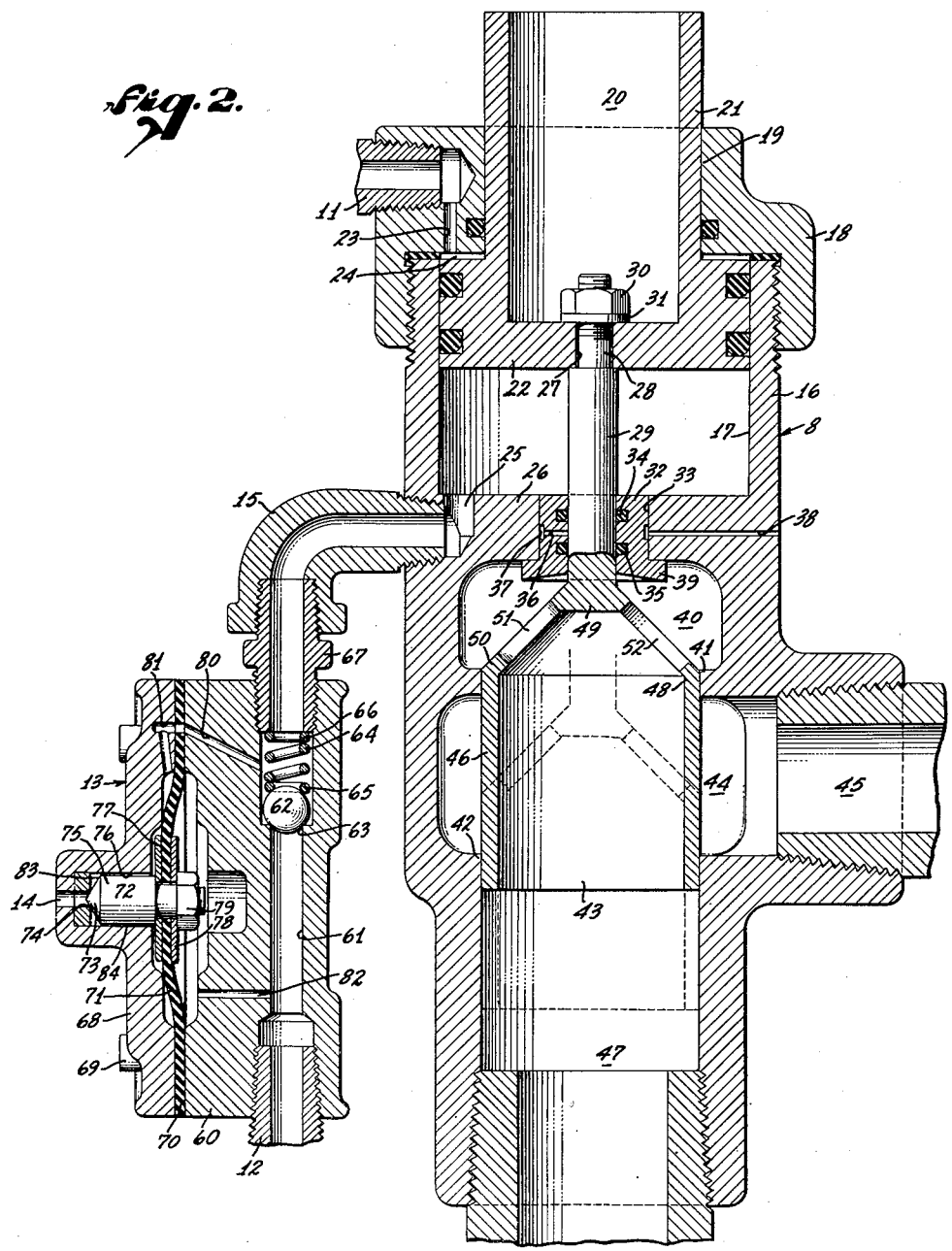

Fig. 2 is an enlarged vertical sectional view of the pressure regulator of Fig. 1.

2

Referring in detail to the drawings, the fluid pump 1 is driven by a motor not shown. The outlet 2 of pump 1 is delivered through suitable pipe connections 3 and a check valve 4 which opens in the direction indicated by the arrow 5, to a storage tank 6 from which liquid under pressure is supplied by outlet 7 to one or more hydraulic cylinders not shown, or the outlet of pump 1 may be delivered through a by-pass regulator valve 8 to a tank 9 from which fluid is supplied to the inlet 10 of the pump.

As shown in Fig. 2, the pressure in tank 6 is supplied to the regulator valve 8 by a pipe connection 11. Air at constant pressure is fed to the line 12, the pressure being regulated by the usual pressure regulator not shown. The air pressure in line 12 passes through relief valve 13 and is fed by a suitable connection 15 to the regulator valve 8.

As shown in Fig. 2, regulator 8 has a valve casing 16 at the upper end of which is a large cylinder 17 closed by a cap 18 having a smaller cylinder 19. The differential piston 20 has a sleeve 21 which slidingly fits in cylinder 19 and a larger head 22 which slidingly fits in the cylinder 17. The tank pressure from conduit 11 is admitted through passage 23 in the cap 18 to the annular area 24 which has an area equal to the difference between the areas of the piston head 22 and sleeve 21, while the constant regulated air pressure is delivered by a conduit 15 through a passage 25 in the wall 26 to the end of piston 22. The ratio of the area of piston 22 to the annular area 24 in the example illustrated is two and one-half to one, although other values may be used. The usual shop has a source of air pressure of about 70 to 125 pounds p. s. i. which may have a conventional pressure regulator and check valve and supplied at constant pressure to the connection 12 although other pressures may be used. At any rate, the pressure in tank 6 will be regulated at a value which is greater than the pressure in line 12, by two and one-half times in the example illustrated or by whatever the differential piston ratio may be.

Piston head 22 has an axial bore 27 to receive the threaded end 28 of a piston rod 29 secured to head 22 by a nut 30 and washer 31. Rod 29 slidingly fits in a bearing 32 force fitted in a bore 33 in the wall 26. Bearing 32 has an upper ring seal 34 and a lower ring seal 35. Between ring seals 34 and 35 is a radial bleed passage 36 communicating with a peripheral passage 37, the latter communicating with a passage 38 through the casing 16 and opening to atmosphere. Air which leaks downwardly past the ring seal 34 and fluid which leaks upwardly through ring seal 35 around rod 29, both bleed to atmosphere through passageway 38. Bearing 32 has an enlarged head 39 which bears against the underside of wall 26.

Wall 26 separates cylinder 17 from upper valve chamber 40. Chamber 40 at the bottom thereof has an annular ring seat 41 and spaced therefrom is a companion cylindrical seat 42 for a sleeve valve head 43. Between seats 41 and 42 is an enlarged valve chamber 44 which communicates with an outlet 45 leading to tank 9.

Valve 43 has an imperforate cylindrical portion 46 of a length sufficient to bridge the space between seats 41 and 42 and shut off flow to the outlet 45 when valve 43 is in the full line position shown in Fig. 2. Valve 43 is a sleeve valve and fluid from the inlet 47 is admitted to the interior of valve 43 at all times. The inlet 47 is an extension of seat 42.

Valve 43 at its upper end 48 is connected to the lower end 49 of rod 29 by an upwardly converging conical portion 50, serving as a spider and having a plurality of ports indicated at 51 and 52.

The upper valve chamber 40 has no lateral outlet and when valve 43 is in the full line position shown in Fig. 2, the full pump pressure is admitted through ports 51 and 52 to chamber 40. Such pressure is balanced on rod 29 except for the unbalanced pressure on the end 49 for the area of rod 29 in bearing 32 and such unbalanced pressure is employed to give the valve 43 a snap action as follows.

When valve 43 is closed as shown in Fig. 2, this represents the condition existing with air pressure in cylinder 17 greater than two and one-half times the tank pressure acting on annular piston 24 and the pump at this time is not by-passing but is building up pressure in tank 6. Valve 43 will start to open and permit fluid in inlet 47 to pass through ports 51 and 52 into outlet 45 when the tank pressure acting on annular area 24 is greater than the friction of the parts plus (1) the constant pressure acting on piston head 22, and (2) the pump pressure acting on the unbalanced end 49 of the piston rod. As soon as the tank pressure exceeds those opposing forces, valve 43 starts to descend and open and as soon as it initially opens, the pump starts to by-pass and the pressure on the unbalanced end 49 of the piston rod is thereby reduced, such reduction increasing the effectiveness of the force tending to open the valve whereby it accelerates and quickly moves to fully open position shown in dotted lines. On the other hand, valve 43 will start to close when the force acting on piston 22 exceeds the tank pressure acting on the smaller piston 24, the force acting on the unbalanced rod end 49 being negligible at the start, with valve 43 fully open. As soon as valve 43 moves towards closed position, pressure builds up inside of valve 43 and on the rod end 49 and this gives an auxiliary force which causes valve 43 to accelerate and quickly reach closed position with a snap action.

The area of ports 51 and 52 is large enough to cause no appreciable restriction of the flow when valve 43 is open. Valve 43 has only two operating positions, namely, either a fully open position or a fully closed position, thereby avoiding a restricted partially open position and its consequent heating of the fluid passing through valve 43.

Relief valve 13 comprises a base 60 having a through passage 61 having a spring pressed check valve 62. Valve 62 is shown as a ball held to its seat 63 by a suitable spring 64 having a flat turn 65 on the ball 62 and a flat turn 66 on the end of a coupling 67 connected with the elbow 15. Base 60 has a cap 68 held in position by a number of bolts indicated at 69. Serving as a gasket for cap 68 is the periphery 70 of a flexible diaphragm 71 of neoprene or the like. Diaphragm 71 has a valve 72 having a conical head 73 for a seat 74 which opens into the outlet 14. Valve 72 has a cylindrical shank 75 which slidingly fits in the bore 76 in the cap. Shank 72 has flat sides 83, 84 for passage of air. Valve 72 is suitably secured to diaphragm 71 by washers 77 and 78 and a nut 79. Behind check valve 62, base 60 has a passage 80 extending through diaphragm 70 and through cap 68 as indicated at 81, to the outer side of diaphragm 71. On the other side of check valve 62, base 60 has a passage 82 communicating with the inner side of diaphragm 71.

Check valve 62 remains closed as long as the regulated air supply from connection 12 is equal to or less than the pressure in cylinder 17, which occurs for example, when piston head 22 ascends or is stationary. When piston head 22 descends and moves in the direction in which check valve 62 seats, back pressure builds up behind check valve 62 in cylinder 17 and the connections 15 and 67 communicating with it. When such back pressure exceeds the pressure in inlet 12, valve 72 opens to discharge such excess to atmosphere through outlet 14. When such back pressure drops sufficiently, the pressure in passage 82 causes valve 72 to close as the pressure ahead of check valve 62 builds up until it reaches a point where it will overcome the spring 64.

The back pressure relief valve 13 thus prevents back pressure in cylinder 17 from hindering the snap action of the by-pass regulator valve 43.

The pressure regulator, as shown in Figs. 1 and 2 and above described, has been constructed and tested and found to operate as above described.

While the relief valve 13 is shown as suspended from elbow 15 with through passage 61 vertical, whereby the weight of valve 72 has no influence on its closing, it is not necessary that valve 13 be mounted in this position. It has also been used with passage 62 horizontal and valve 72 vertical and below it whereby the weight of valve 72 assists in closing it. Relief valve 13 works equally well in various positions.

The relief valve shown and described herein is described and claimed in co-pending application Serial Number 28,632, filed May 22, 1948, for Back Pressure Relief Valve.

It will be apparent that various modifications may be made in the invention without departing from the spirit of the following claims. For example, the value of the regulated pressure in tank 6 may be readily changed by changing the setting of the pressure regulator not shown, for the constant pressure air inlet 12. Also the pressure to be regulated may have a value lower, by the differential ratio, than the constant pressure in inlet 12, by reversing the connections 11 and 15 to the piston, whereby the constant air pressure acts on the smaller piston area, while the pressure to be regulated acts on the larger piston area.

The ratio between the combined areas of the ports like 51, 52 to the area of outlet 45 is not critical, but a ratio of one-to-one is preferred.

Fig. 2 shows full scale the pressure regulator which has been tested as above described. Other diameters, larger or smaller, for piston rod 29, without changing the size of valve 43 may be used and will have a direct effect on the differential of the pressure regulated. As the rod 29 increases in diameter, the wider is the range between opening and closing. This fact will hold true theoretically as a proportional relationship but the diameter shown in Fig. 2 gives the most desirable differential. This equals 30 lbs. p. s. i. at 180 lbs. shut-off pressure. In other words, the pressure drops from 180 lbs. p. s. i. to 150 lbs. p. s. i. to start up. Now, if one increases the diameter of rod 29 one-eighth in diameter, it results in approximately 40 lbs. differential.

Spring 64 is comparatively weak and just sufficient to hold the ball check valve 62 on its seat, unseating at about 1 lb. p. s. i.

Diaphragm 71 is not stretched tight but instead its central active portion is loose or flabby whereby diaphragm 71 does not provide any force to restore relief valve 72 to one position or another, whereby valve 72 is inert and remains in its actuated position either open or closed until a fluid pressure on one side of the diaphragm 71 or the other actuates it to its alternate position. The ratio of the area of diaphragm 71 to the area of seat 14 is 135 to 1, which means that if there is a pressure of 135 lbs. acting on both sides of diaphragm 71, there is a fluid pressure of 1 lb. acting to hold valve 72 on its seat, the fluid pressure acting on valve 72 being unbalanced over the area of seat 14. However, when back pressure begins to build up, check valve 62 being closed, only a small increase in such back pressure will operate valve 72 as this back pressure acts on the large area of the diaphragm 71. The air pressure in inlet 12 may be from 40 to 125 lbs. with an average of 90 lbs. p. s. i., although other values can be used.

I claim:

1. A valve comprising a casing having a cylinder and a valve chamber with a wall therebetween, a valve seat in said chamber, a piston in said cylinder, said casing having fluid pressure connections for operating said piston, a reciprocating valve head for said seat, a rod extending through said wall and connecting said piston and said valve head, a bearing in said wall for said rod, said valve casing having an inlet and an outlet controlled by said valve head, the portion of said rod projecting through said wall into said valve chamber exposed to pressure at said inlet for all operative positions of said valve head, the pressure in said inlet acting on said stem area tending to close said valve head to its said seat, the area of said rod in said bearing comprising means responsive to fluid pressure conditions in said inlet for accelerating both the opening and closing movements of said valve head when operated by said piston.

2. A pressure regulator comprising a valve for regulating fluid pressure, a differential piston for operating said valve, means for supplying fluid pressure to be regulated to one portion of said piston, other means for supplying a constant air pressure to another portion of said piston, said other means comprising a conduit having a check valve and developing back pressure greater than said constant pressure, auxiliary pressure responsive means operative on initial opening or closing of said valve to quickly fully operate said valve to open or closed position, and means responsive when said back pressure exceeds said constant pressure to relieve such excess and thereby prevent such excess back pressure from hindering the operation of said auxiliary pressure responsive means.

3. A pressure regulator according to claim 2 wherein said excess back pressure responsive means comprises a relief valve having a diaphragm, said relief valve having a passage exposing one side of said diaphragm to said constant pressure and tending to close said relief valve and a passage exposing the other side of said diaphragm to said back pressure.

4. A valve mechanism comprising a casing having spaced parallel cylindrical seats, an inlet opening into the interior of one of said seats, a cylindrical valve slidably fitting in said seats, an outlet between said seats, said valve having a length greater than the distance between said seats, and means for moving said valve axially to one position bridging said seats to shut off said inlet from said outlet and to a non-bridging position to connect said inlet and outlet, said means comprising a piston having differential areas, means for supplying a substantially constant fluid pressure to one of said areas, and means for supplying a variable fluid pressure to the other of said areas.

5. A pressure regulator according to claim 2 wherein said valve comprises a hollow cylindrical valve slidably fitting in spaced parallel cylindrical seats, with an inlet opening into said valve and into one of said seats, and an outlet between said seats, said auxiliary pressure responsive means comprising a stem on said valve exposed to pressure at said inlet.

6. A pressure regulator according to claim 2 wherein said excess back pressure responsive means comprises a relief valve having a diaphragm, said relief valve having a passage exposing one side of said diaphragm to said constant pressure and tending to close said relief valve and a passage exposing the other side of said diaphragm to said back pressure, a spring operated check valve between said passages and preventing back-flow from said back pressure to said constant pressure, said diaphragm being of flabby material having substantially no restoring force or spring whereby fluid pressure in said passages comprises the sole means for operating said diaphragm.

WILLIAM H. SCHMITT.

REFERENCES CITED

The following references are of record in the file of this patent:

UNITED STATES PATENTS

| Number | Name | Date |
|---|---|---|
| 1,257,070 | Discher | Feb. 19, 1918 |
| 1,994,747 | Bishop | Mar. 19, 1935 |
| 2,047,581 | Grissett | July 14, 1936 |
| 2,163,800 | Nevin | June 27, 1939 |
| 2,207,382 | McNamara | July 9, 1940 |

FOREIGN PATENTS

| Number | Country | Date |
|---|---|---|
| 495,422 | Great Britain | Nov. 14, 1938 |